United States Patent
Chen et al.

(10) Patent No.: US 11,347,520 B2
(45) Date of Patent: May 31, 2022

(54) UNAVAILABLE MEMORY DEVICE INITIALIZATION SYSTEM

(71) Applicant: Dell Products L.P., Round Rock, TX (US)

(72) Inventors: Chih-Chung Chen, New Taipei (TW); Shih-Hao Wang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 319 days.

(21) Appl. No.: 16/789,994

(22) Filed: Feb. 13, 2020

(65) Prior Publication Data

US 2021/0255966 A1 Aug. 19, 2021

(51) Int. Cl.
*G06F 9/44* (2018.01)
*G06F 9/4401* (2018.01)
*G06F 12/126* (2016.01)
*G06F 12/02* (2006.01)
*G06F 13/16* (2006.01)

(52) U.S. Cl.
CPC .......... *G06F 9/4408* (2013.01); *G06F 9/4411* (2013.01); *G06F 12/0238* (2013.01); *G06F 12/126* (2013.01); *G06F 13/1689* (2013.01)

(58) Field of Classification Search
CPC .... G06F 9/4408; G06F 12/126; G06F 9/4411; G06F 12/0238; G06F 13/1689
See application file for complete search history.

(56) References Cited

U.S. PATENT DOCUMENTS

| | | | | |
|---|---|---|---|---|
| 5,428,796 A | * | 6/1995 | Iskiyan | G06F 3/0601 710/240 |
| 5,526,507 A | * | 6/1996 | Hill | G06F 11/1076 711/E12.019 |
| 5,915,094 A | * | 6/1999 | Kouloheris | G06F 3/067 709/219 |

(Continued)

OTHER PUBLICATIONS

Reboot and Select proper Boot device error message on Windows computer by WindowsClub (Year: 2017).*

(Continued)

*Primary Examiner* — Paul M Knight
(74) *Attorney, Agent, or Firm* — Joseph Mencher

(57) ABSTRACT

An unavailable memory device initialization system includes a memory controller device that is configured to determine whether a memory system includes unavailable memory devices during initialization operations. During the first initialization operations, a BIOS engine identifies unavailable memory device(s) in the memory system that were determined to be unavailable by the memory controller device during the first initialization operations and, in response, stores respective unavailable memory device identifier(s) associated with each unavailable memory device in a non-volatile storage subsystem. Subsequently, during second initialization operations and based on the respective unavailable memory device identifier(s) stored in the non-volatile storage subsystem, the BIOS engine generates a memory overlay that hides each unavailable memory device from the memory controller device such that the memory controller device determines that the memory system does not include any unavailable memory devices during the second initialization operations.

20 Claims, 9 Drawing Sheets

(56) References Cited

U.S. PATENT DOCUMENTS

| | | | | |
|---|---|---|---|---|
| 6,571,355 | B1* | 5/2003 | Linnell | G06F 11/2094 |
| | | | | 714/4.2 |
| 7,296,180 | B1* | 11/2007 | Waterhouse | G06F 11/2094 |
| | | | | 714/2 |
| 8,452,949 | B1* | 5/2013 | Streuter | G06F 9/4408 |
| | | | | 713/1 |
| 2003/0093721 | A1* | 5/2003 | King | G11B 25/043 |
| | | | | 714/42 |
| 2004/0153724 | A1* | 8/2004 | Nicholson | G06F 11/0709 |
| | | | | 714/E11.133 |
| 2011/0078433 | A1* | 3/2011 | Bert | G06F 9/4411 |
| | | | | 713/2 |
| 2011/0113227 | A1* | 5/2011 | Lu | G06F 9/4408 |
| | | | | 713/2 |
| 2016/0210161 | A1* | 7/2016 | Rosset | G06F 9/4408 |
| 2017/0322186 | A1* | 11/2017 | Su | G01N 27/00 |
| 2017/0322816 | A1* | 11/2017 | Parthiban | G06F 9/4416 |
| 2018/0285123 | A1* | 10/2018 | Kumar | G06F 8/654 |

OTHER PUBLICATIONS

How Fault Resilient Booting (FRB) Works on Intel® Server Boards and Intel® Server Systems by Intel (Year: 2017).*
Data hiding in the NTFS file system by Huebner 2006 (Year: 2006).*
Hiding in a Virtual World by Bares (Year: 2009).*

* cited by examiner

UNAVAILABLE MEMORY DEVICE INITIALIZATION SYSTEM

BACKGROUND

The present disclosure relates generally to information handling systems, and more particularly to initializing information handling systems that include unavailable memory devices.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server computing devices, desktop computing devices, laptop/notebook computing devices, tablet computing devices, mobile phones, and/or other computing devices known in the art, include memory systems that are utilized in the operation of those computing devices. Such memory systems may utilize a variety of memory components including, for example, memory devices, memory controller devices, and/or or other memory components known in the art. In a specific example, the memory controller device in the memory system may implement features to interface with a Basic Input/Output System (BIOS) in the computing device in order to manage data flow with the main memory subsystem in the computing device that may be provided by, for example, Dual Inline Memory Modules (DIMM) devices (e.g., data flow such as reading and writing to the main memory subsystem, performing data security operations, performing data reliability operations, and/or other memory management operations known in the art.) However, conventional memory management operations can raise some issues.

In many situations, the data reliability operations discussed above may include the memory controller device performing operations that provide for the identification of DIMM devices that are faulty or otherwise unavailable. For example, the identification of faulty or otherwise unavailable DIMM devices discussed above may occur as part of the Power-On Self Test (POST) operations that are performed when the computing device is powered on, and many conventional memory management operations provide for the halting of boot or other initialization operations for the computing device in response to an identified fault or unavailability of a DIMM device. For example, if any of the DIMM devices providing the memory system are damaged, faulty, or otherwise unavailable, the system will "hang" early in the POST operations, and the BIOS will display a message on the computing device that informs the user that a bad DIMM device has caused boot/initialization operations for the computing device to halt. In response, the user must then open the chassis of the computing device and remove and/or replace the unavailable DIMM device in order to allow the computing device to subsequently boot and initialize, which is inconvenient for users that need to utilize the computing device immediately, particularly when those users are remote from the computing device.

In order to address this issue, some computing devices include features such as, for example, the Fault Resilient Booting (FRB) feature available in processing systems provided by INTEL® corporation of Santa Clara, Calif., United States, which allow initialization operations to complete in such unavailable DIMM situations, and are often implemented by disabling the faulty or unavailable DIMM device, and using only the remaining available DIMM devices in the computing device. For example, in such computing devices, the memory controller device in the memory system may be integrated as part of the motherboard or processing system in the computing device (e.g., as with the XEON® E5 processor available from INTEL® Corporation of Santa Clara, Calif., United States), and may implement features to interface with subsystems provided by Memory Reference Code (MRC) included in the BIOS in order to manage data flow with the main memory subsystem.

In a specific example, when a computing device includes a memory controller device that implements the FRB feature discussed above, the BIOS may utilize the MRC interface with the memory controller device during the POST operations discussed above, and the memory controller device (e.g., integrated with the XEON® E5 processor discussed above) may check to see if any DIMM devices are faulty or otherwise unavailable. In the event a faulty or unavailable DIMM device is identified, the memory controller device may generate an error code and provide it to the BIOS, which results in the BIOS recording an error in a system log and continuing the initialization process (e.g., the POST operations discussed above.) As such, the memory controller device disables the faulty or otherwise unavailable memory device, which prevents the computing device from addressing the faulty or unavailable DIMM device until it is replaced, while allowing the computing device to complete initialization and enter a runtime environment.

However, many computing devices do not include memory controller devices that are configured with the memory device disabling feature discussed above (e.g., such as those provided with the XEON® E3 processor available from INTEL® Corporation of Santa Clara, Calif., United States), and one of skill in the art in possession of the present disclosure will appreciate that such memory-device-disabling-enabled memory controller devices are often only included in relatively expensive, "higher end" computing devices (e.g., computing devices including the XEON® E5 processors discussed above), and thus relatively less expensive, "lower end" computing devices (e.g., computing devices including the XEON® E3 processors discussed above) will simply halt initialization operations in the event faulty or unavailable DIMM device is detected during initialization as discussed above. Furthermore, because the memory controller device is often integrated into the processor, the disabling features discussed above cannot be enabled without changing the processor in the computing device, which is often the most expensive component in that computing device. As such, conventional computing devices require users to either expend additional resources for computing devices with silicon/chipset hardware/processing system capabilities and MRC error handling code that provide the advanced memory device disabling capabilities discussed above, or deal with disadvantages associated with unavailable DIMM devices in less expensive computing devices discussed above.

Accordingly, it would be desirable to provide an unavailable memory device initialization system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) engine that is configured to: identify, during first initialization operations, at least one unavailable memory device that is included in the memory system and that was determined to be unavailable by a memory controller device during the first initialization operations; store, during the first initialization operations in a non-volatile storage subsystem in response to identifying the at least one unavailable memory device, respective unavailable memory device identifiers associated with each at least one unavailable memory device; and generate, during second initialization operations that are subsequent to the first initialization operations and based on the respective unavailable memory device identifiers stored in the non-volatile storage subsystem, a memory overlay that hides each at least one unavailable memory device from the memory controller device such that the memory controller device determines that the memory system does not include any unavailable memory devices during the second initialization operations.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
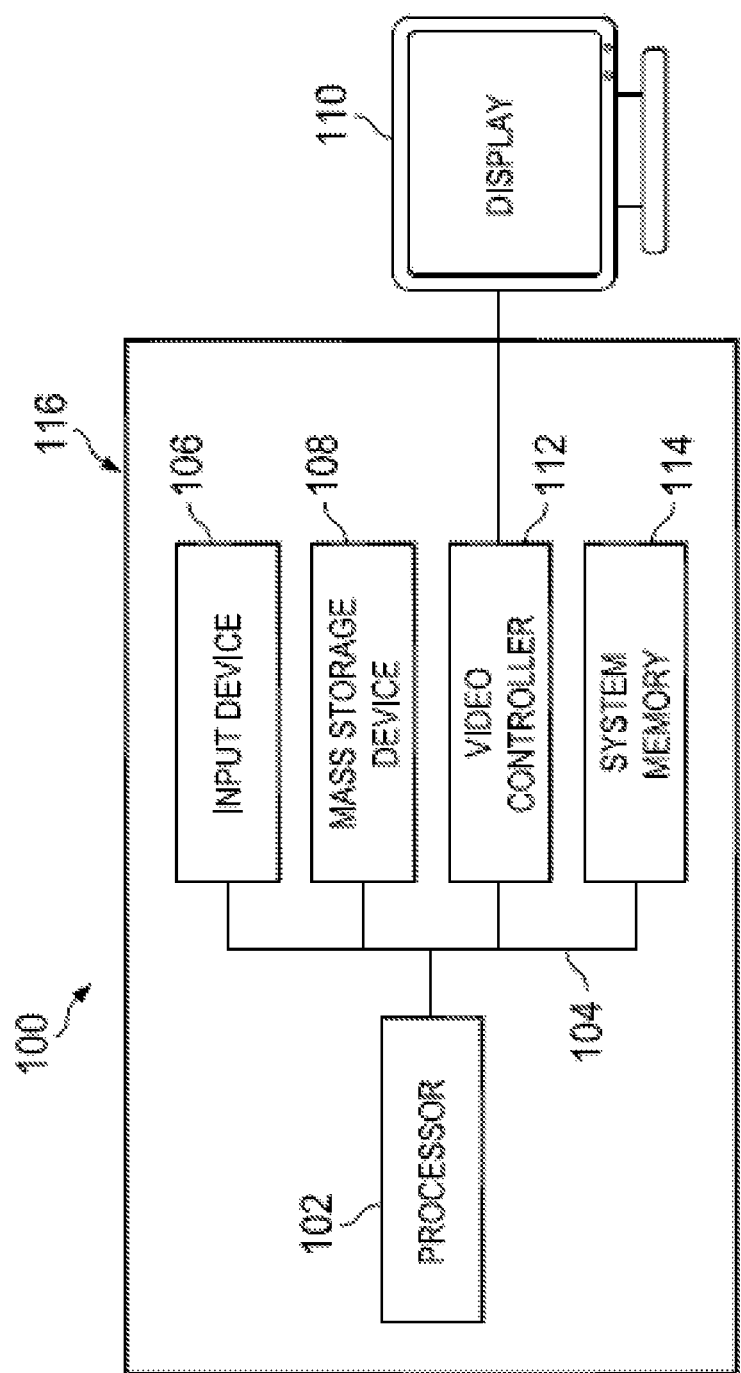
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
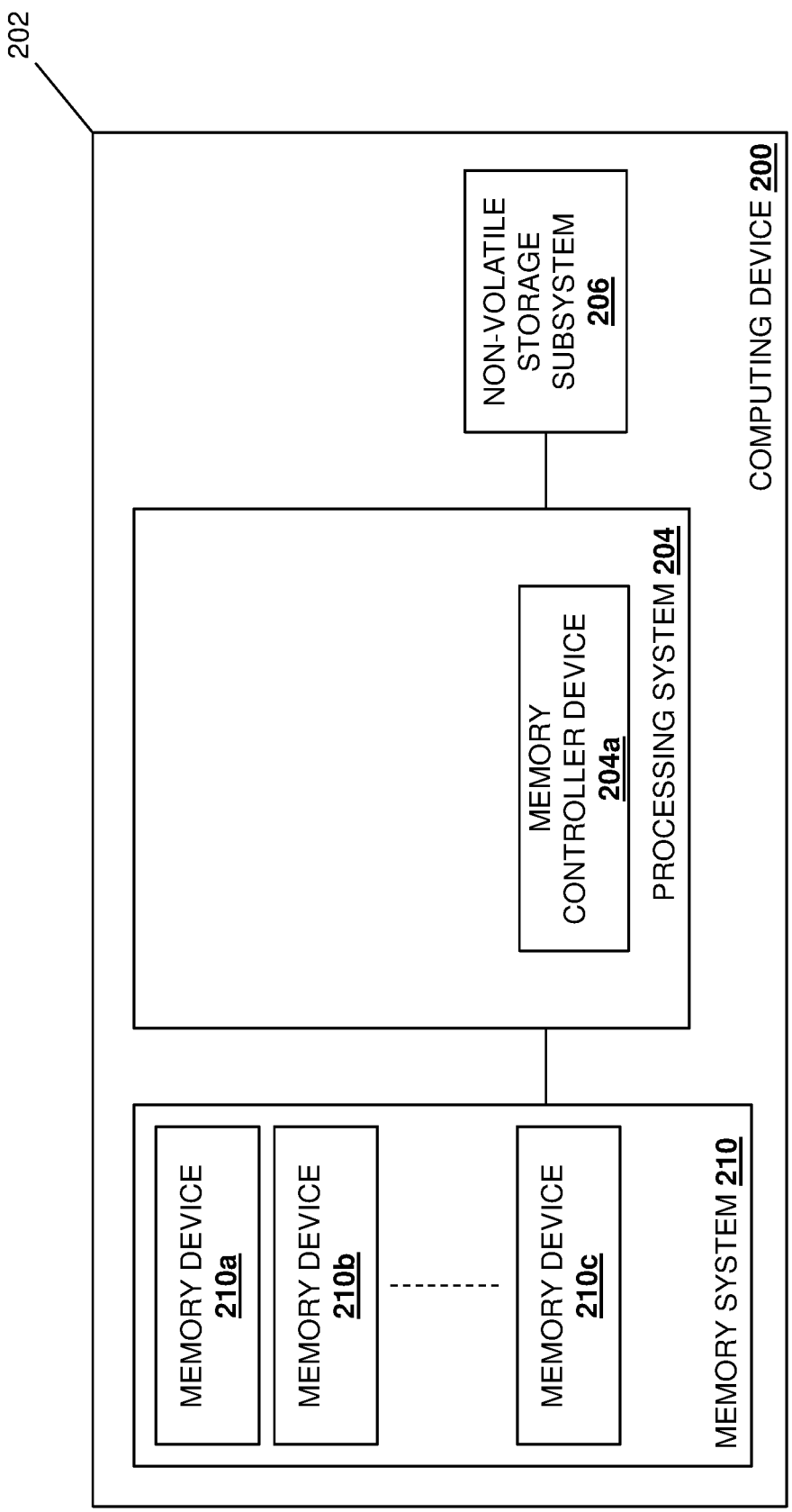
FIG. 2 is a schematic view illustrating an embodiment of a computing device that include the unavailable memory device initialization system of the present disclosure.
Figure 3:
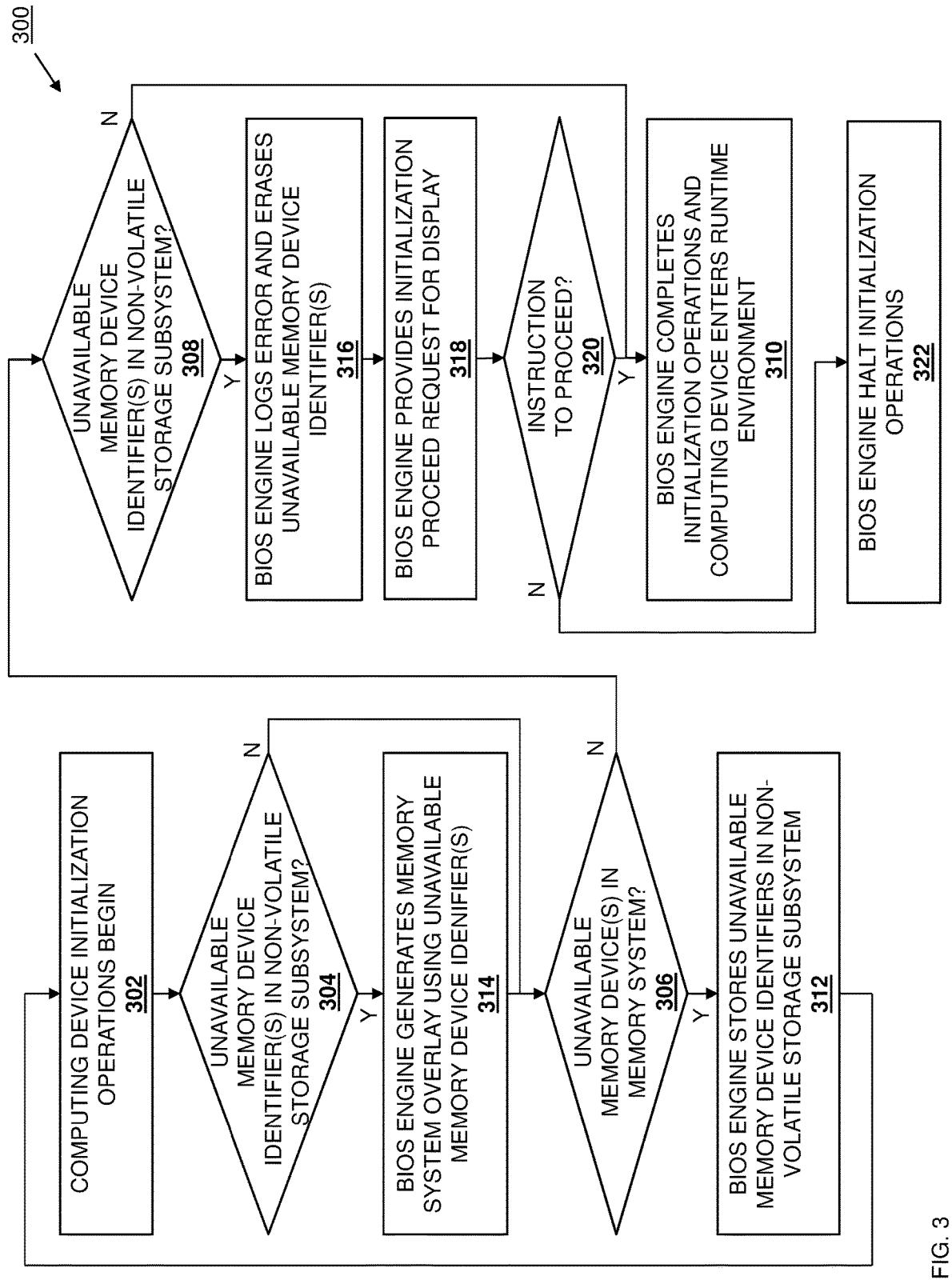
FIG. 3 is a flow chart illustrating an embodiment of a method for initializing a computing device including unavailable memory device(s).

Referring now to FIG. 2, an embodiment of a computing device 200 is illustrated that includes the unavailable memory device initialization system of the present disclosure. In an embodiment, the computing device 200 may be provided by the IHS 100 discussed above with reference to FIG. 1 and/or may include some or all of the components of the IHS 100, and in specific examples may be provided by a server computing device, a desktop computing device, a laptop/notebook computing device, a tablet computing device, a mobile phone, and/or other computing devices that would be apparent to one of skill in the art in possession of the present disclosure. However, while one of skill in the art in possession of the present disclosure will recognize that the computing device 200 is illustrated and discussed below as being provided by a server computing device, one of skill in the art in possession of the present disclosure will appreciate that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated below. For example, the chassis 302 may house a processing system 204 (e.g., which may include the processor 102 discussed above with reference to FIG. 1) that, in the illustrated embodiment, includes a memory controller 204a that may be an integrated processing subsystem included on the processing system 204, although one of skill in the art in possession of the present disclosure will appreciate that the memory controller 204a may be provided separate from and connected to the processing system 204 while remaining within the scope of the present disclosure as well. Furthermore, while only a single processing subsystem (i.e., the memory controller device 204a) is illustrated with the processing system 204 in FIG. 2, one of skill in the art in possession of the present disclosure will appreciate that other processing subsystems may be included with the processing system 204 in order to provide the processing system functionality discussed below. For example, the processing system 204 may include a chipset, a Central Processing Unit (CPU), CPU cores (e.g., a Direct eXecution Environment (DXE) core and/or other CPU cores known in the art), and/or any other processing subsystems that one of skill in the art in possession of the present disclosure will appreciate may be configured to provide the Basic Input/Output System (BIOS) engine functionality and/or other functionality discussed below.

In the illustrated embodiment, a non-volatile storage subsystem 206 is coupled to the processing system 204 and, in a specific example, may be provided by a Serial Peripheral Interface (SPI) flash memory device, and/or any of a variety of other non-volatile storage subsystems that one of skill in the art in possession of the present disclosure would recognize are accessible to a BIOS engine provided by the processing system 2004. In the illustrated embodiment, a memory system 210 (e.g., which may include the memory 114 discussed above with reference to FIG. 1) is also coupled to the processing system 204 and includes a plurality of memory devices 210a, 210b, and up to 210c. For example, the memory devices 210a-210c that provide the memory system 210 may be provided by Dual Inline Memory Module (DIMM) devices including Dynamic Random Access Memory (DRAM) devices, as well as a variety of other memory devices that would be apparent to one of skill in the art in possession of the present disclosure.

As will be understood by one of skill in the art in possession of the present disclosure, the memory system 210 may include instructions that, when executed by the processing system, cause the processing system to provide the BIOS engine discussed below that is configured to perform the functionality of the BIOS engines and/or computing devices discussed below. Furthermore, one of skill in the art in possession of the present disclosure will recognize that the instructions on the memory system 210 utilized by the processing system 204 to provide the functionality discussed below may be stored elsewhere (e.g., instructions to provide a BIOS engine may initially be stored in a SPI flash memory device and may be copied by a chipset in the processing system 204 to the memory system 210, where it is then executed by a CPU in the processing system 204 to provide that BIOS engine) while remaining within the scope of the present disclosure as well. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component capabilities for providing conventional computing device functionality, as well as the functionality discussed below, while remaining within the scope of the present disclosure as well.

Referring now to FIG. 4, an embodiment of a method 300 for initializing a computing device including an unavailable memory device is illustrated. As discussed below, the systems and methods of the present disclosure provide for the identification of unavailable memory devices in a memory system during computing device initialization operations and, in response, the generation of a memory overlay that hides each unavailable memory device from a memory controller device. As such, the memory controller device may then determine that the memory system does not include any unavailable memory devices during performance of memory training operations, which allows the initialization operations to complete so that the computing device may enter a runtime environment. For example, during first initialization operations, a BIOS engine may identify unavailable memory device(s) that are included in a memory system and that were determined to be unavailable by the memory controller device during the first initialization operations and, in response, may store respective unavailable memory device identifiers associated with each unavailable memory device in a non-volatile storage subsystem. Subsequently, during second initialization operations and based on the respective unavailable memory device identifiers stored in the non-volatile storage subsystem, the BIOS engine may generate a memory overlay that hides each unavailable memory device from the memory controller device during memory training operations. As such, as "software" solution is provided that allows a computing device to initialize when unavailable memory devices exist in its memory system, and that may be utilized with computing devices having relatively inexpensive processing systems that do not include the silicon/chipset hardware/processing system capabilities and MRC error handling code that provide the advanced memory device disabling capabilities in the relatively expensive processing systems discussed above.

As discussed in detail below, the unavailable memory device initialization system of the present disclosure may iterate through the method 300 multiple times and over multiple initializations of the computing device 200 in order to allow a computing device to initialize and enter a runtime environment when memory devices in its memory system are unavailable. In an attempt to clearly illustrate and describe the functionality of the systems and methods of the present disclosure, the performance of the method 300 will first be described in the computing device 200 when no memory devices in its memory system 210 are unavailable, followed by its performance (and multiple iterations) with one or more unavailable memory devices in its memory system 210. However, while some specific performances of the method 300 are described below, one of skill in the art in possession of the present disclosure will recognize that the discussion below is provided merely as an example, and the method 300 may be performed in a variety of manners that will fall within the scope of the present disclosure as well.

To begin with an example in which all of the memory devices 210a-210c in the memory system 210 in the computing device 200 are available, the method 300 may begin at block 302 where computing device initialization operations begin. In an embodiment, at block 302, the computing device 200 may be powered on, booted, reset, and/or otherwise initialized such that the processing system 204 (and/or other systems and subsystems in the computing device 200) begin performing initialization operations. As described above, in some examples a chipset in the processing system 204 may copy BIOS code/instructions that are stored in a SPI flash memory device to the memory system 210, and the BIOS code/instructions may then be executed by a CPU in the processing system 204 to provide a BIOS engine 400 and a memory overlay database 401 (e.g., a software implemented database included in the BIOS) that are illustrated in FIGS. 4A-4F below. However, while described as a BIOS engine 400 that provides BIOS functionality, one of skill in the art in possession of the present disclosure will appreciate that the BIOS engine 400 may be provided by or include a Unified Extensible Firmware Interface (UEFI) engine provided according to the UEFI specification that defines a software interface between an operating system and platform firmware in a computing device, and that has been provided as a replacement for legacy BIOS subsystems. As such, while the present disclosure describes a BIOS engine, one of skill in the art in possession of the present disclosure will appreciate that any of a variety of initialization engines may be utilized with the teachings of the present disclosure and thus will fall within its scope as well. Thus, at block 302, the computing device 200 and/or the BIOS engine 400 may perform any of a variety of initialization operations that would be apparent to one of skill in the art in possession of the present disclosure.

The method 300 then proceeds to decision block 304 where it is determined whether one or more unavailable memory device identifiers are stored in a non-volatile storage subsystem. As discussed in further detail below, embodiments of decision block 304 may be performed by the BIOS engine 400 to determine whether unavailable memory device identifiers that identify unavailable memory devices in the memory system 210 are stored in the non-volatile storage subsystem 206. However, in this example, all of the memory devices 210a-210c in the memory system 210 are available, and thus no unavailable memory device identifiers were stored in the non-volatile storage subsystem during previous initializations of the computing device 200 on previous iterations of the method 300. As such, at decision block 304, it is determined that no unavailable memory device identifiers are stored in the non-volatile storage subsystem 206, and the method 300 proceeds to decision block 306 where it is determined whether one or more memory devices in a memory system are unavailable. As discussed in further detail below, embodiments of decision block 306 may be performed by the BIOS engine 400 to identify whether memory devices in the memory system 210 are unavailable based on determinations made using the memory controller device 204a during memory training operations. However, in this example, all of the memory devices 210a-210c in the memory system 210 are available, and thus the memory controller device 204a will determine that there are no unavailable memory devices in the memory system 210 during memory training operations performed at decision block 306.

As such, at decision block 306, it is determined that no memory devices in the memory system are unavailable, and the method 300 proceeds to decision block 308 where it is determined whether one or more unavailable memory device identifiers are stored in a non-volatile storage subsystem in substantially the same manner as described above for decision block 304. Thus, as discussed in further detail below, embodiments of decision block 308 may be performed by the BIOS engine 400 to determine whether unavailable memory device identifiers that identify unavailable memory devices in the memory system 210 are stored in the non-volatile storage subsystem 206. However, in this example, all of the memory devices 210a-210c in the memory system 210 are available, and thus no unavailable memory device identifiers were stored in the non-volatile storage subsystem during previous initializations of the computing device 200 on previous iterations of the method 300. As such, at decision block 308, it is determined that no unavailable memory device identifiers are stored in a non-volatile storage subsystem 206, and the method 300 proceeds to block 310 where a BIOS engine completes initialization operations and the computing device enters a runtime environment. In an embodiment, at block 310, the BIOS engine 400 (and/or any other subsystems in the computing device 200) may complete any initialization operations that one of skill in the art in possession of the present disclosure would recognize as allowing the computing device 200 to enter a runtime environment (e.g., such that an operating system provided by the processing system 204 takes over control of the operation of the computing device 200.)

As such, in the event there are no unavailable memory devices 210a-210c in the memory system 210 in the computing device 200, the method 400 may provide for the performance of the unavailable memory device identifier checks in the non-volatile storage subsystem 206 at decision blocks 304 and 308, as well as the performance of the unavailable memory device checks in the memory system 210 at decision block 306, but given the availability of the memory devices 210a-210c, the method 300 may proceed such that the initialization operations complete and the computing device 200 enters the runtime environment.

However, one of skill in the art in possession of the present disclosure will appreciate that any of the memory devices 210a-210c in the memory system 210 may become unavailable due to, for example, memory device faults, memory device damage, memory device failure, memory device errors, and/or other memory device unavailability situations known in the art. In order to describe how the systems and methods of the present disclosure operate to handle such a situation, the example of the method 300 below includes one or more unavailable memory devices 210a-210c in the memory system 210 in the computing device 200. As such, the method 300 begins at block 302 where computing device initialization operations begin. Similarly as described above, the performance of block 302 of the method 300 may include the processing system 204 providing the BIOS engine 400 in substantially the same manner as described above, with the BIOS engine 400 (and/or other subsystems in the computing device 200) operating to perform any of a variety of initialization operations that would be apparent to one of skill in the art in possession of the present disclosure. For purposes of this example, this initialization of the computing device 200 is referred to below as the "first" initialization of the computing device 200 that includes the performance of "first" initialization operations in order to distinguish it from previous and subsequent initializations of the computing devices and their corresponding initialization operations.

The method 300 then proceeds to decision block 304 where it is determined whether one or more unavailable memory device identifiers are stored in a non-volatile storage subsystem. As discussed above and in further detail below, embodiments of decision block 304 may be performed by the BIOS engine 400 to determine whether unavailable memory device identifiers that identify unavailable memory devices in the memory system 210 are stored in the non-volatile storage subsystem 206. However, in this example, one or more of the memory devices 210a-210c in the memory system 210 have just become unavailable (i.e., those unavailable memory devices were available on the previous initialization of the computing device 200 that was performed prior to the current, "first" initialization of the computing device 200 and during a most recent iteration of the method 300), and thus no unavailable memory device identifiers were stored in the non-volatile storage subsystem during that most recent iteration of the method 300. As such, at decision block 304, it is determined that no unavailable memory device identifiers are stored in the non-volatile storage subsystem 206, and the method 300 proceeds to decision block 306 where it is determined whether one or more memory devices in a memory system are unavailable.

Figure 4A:
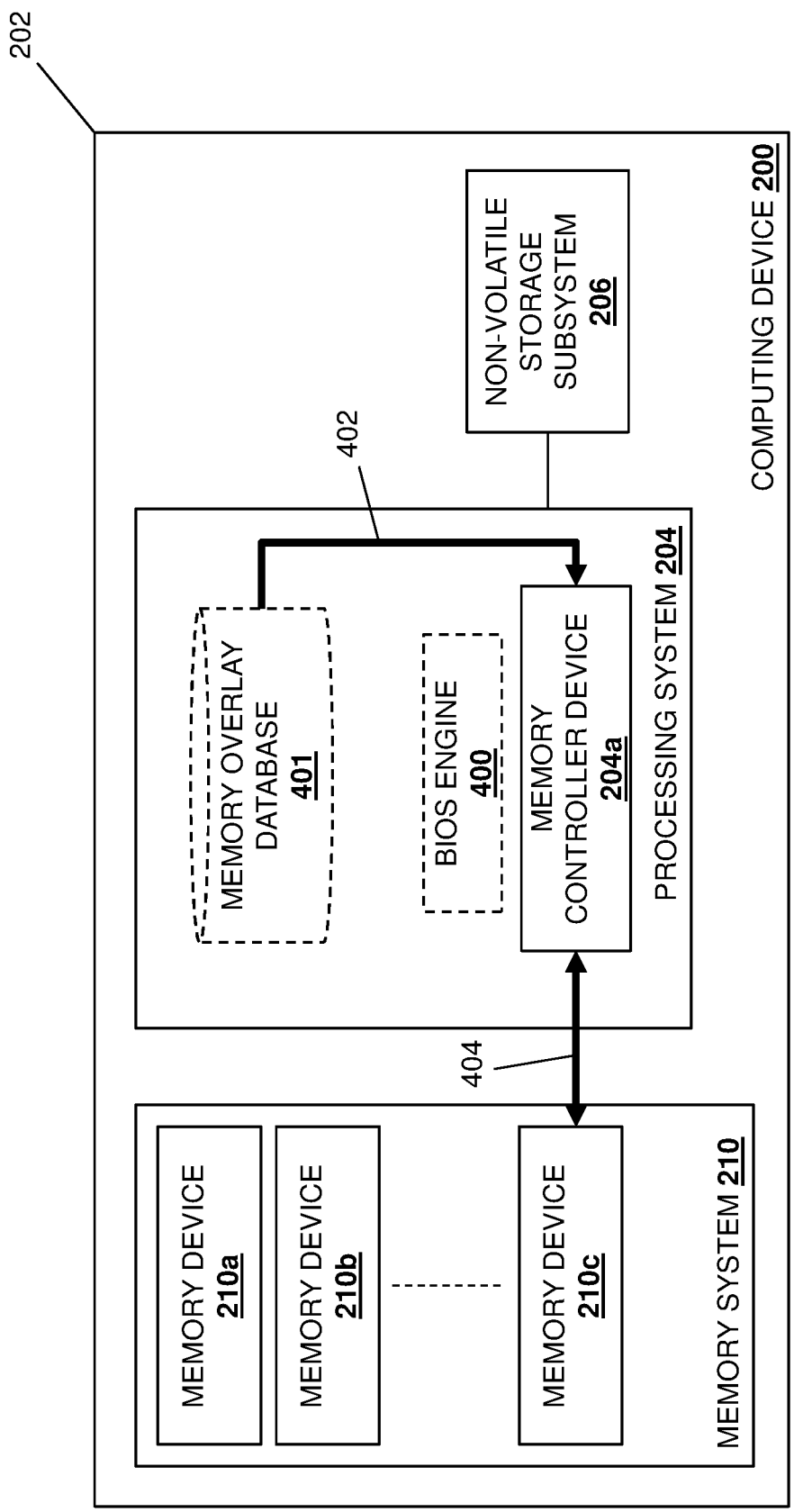
FIG. 4A is a schematic view illustrating an embodiment of the operation of the computing device of FIG. 2 during the method of FIG. 3.
Figure 4B:
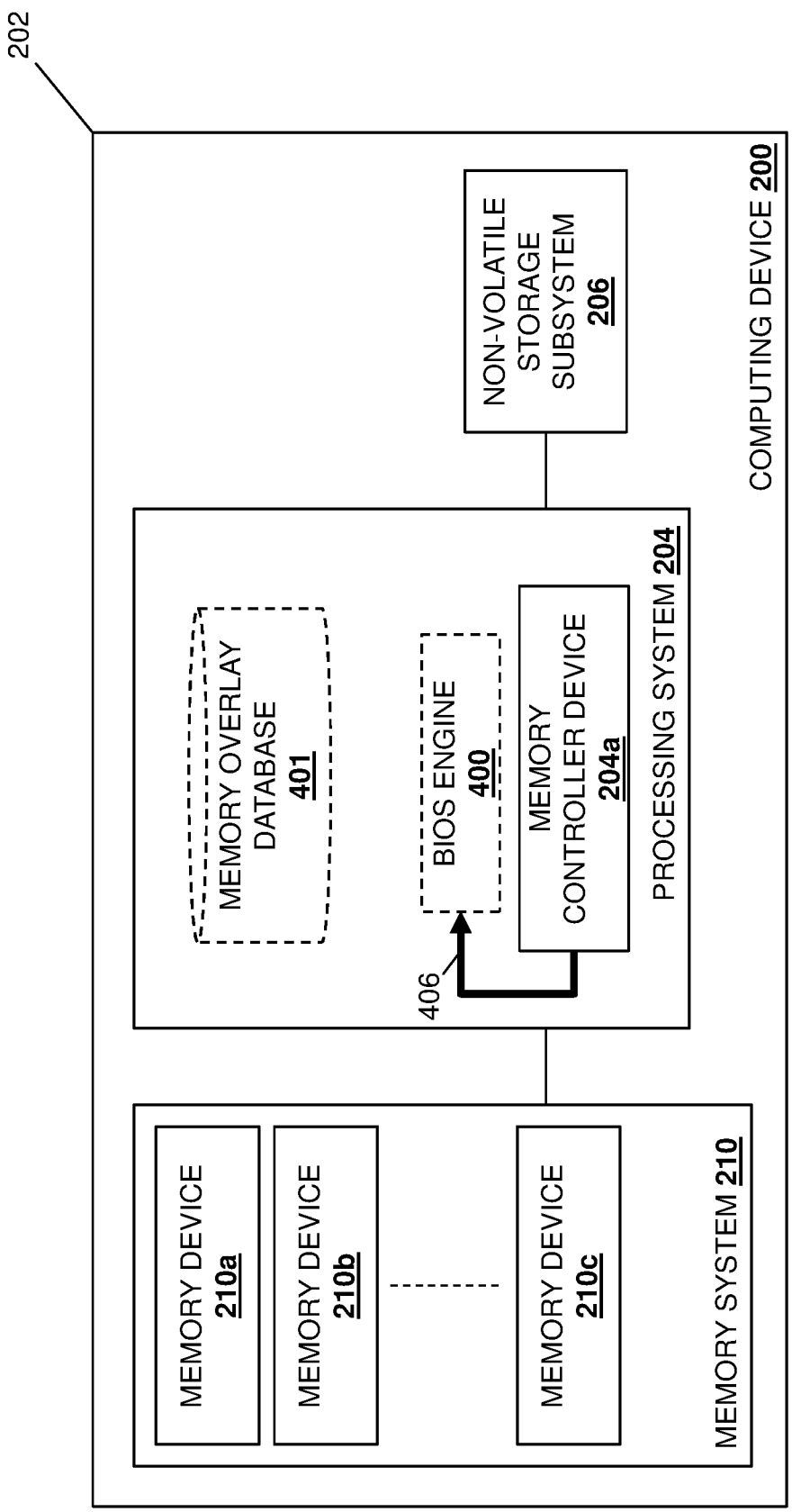
FIG. 4B is a schematic view illustrating an embodiment of the operation of the computing device of FIG. 2 during the method of FIG. 3.

In an embodiment, at decision block 306, the memory controller device 204a may operate to determine whether there are unavailable memory devices in the memory system 210. For example, FIG. 4A illustrates how the memory controller device 204a may perform access operations 402 to access the memory overlay database 401 in order to utilize a memory overlay stored therein to perform memory device availability determination operations 404 that operate to determine whether there are unavailable memory devices in the memory system 210. For example, at decision block 306, Memory Reference Code (MRC) included in the BIOS code discussed above may operate with the memory controller device 204a in order to perform memory training operations that determine whether a memory training/MRC training error is present that is indicative of an unavailable memory device channel to a corresponding memory device. As will be appreciated by one of skill in the art in possession of the present disclosure, the MRC may operate with the memory controller device 204a to perform the memory training operations on memory devices that are indicated as available in the memory overlay, while skipping memory training operations for memory devices that are indicated as unavailable in the memory overlay. Thus, at decision block 306, the BIOS engine 400 may identify whether the memory controller device 204a had determined that any memory devices 210a-210c in the memory system 210 are unavailable (e.g., coupled to unavailable memory device channels) during memory training operations. However, while a specific technique for determining whether a memory device is available (e.g., via the availability of memory device channels determined during memory training operations), one of skill in the art in possession of the present disclosure will appreciate that other techniques for determining memory device availability will fall within the scope of the present disclosure as well.

Figure 4C:
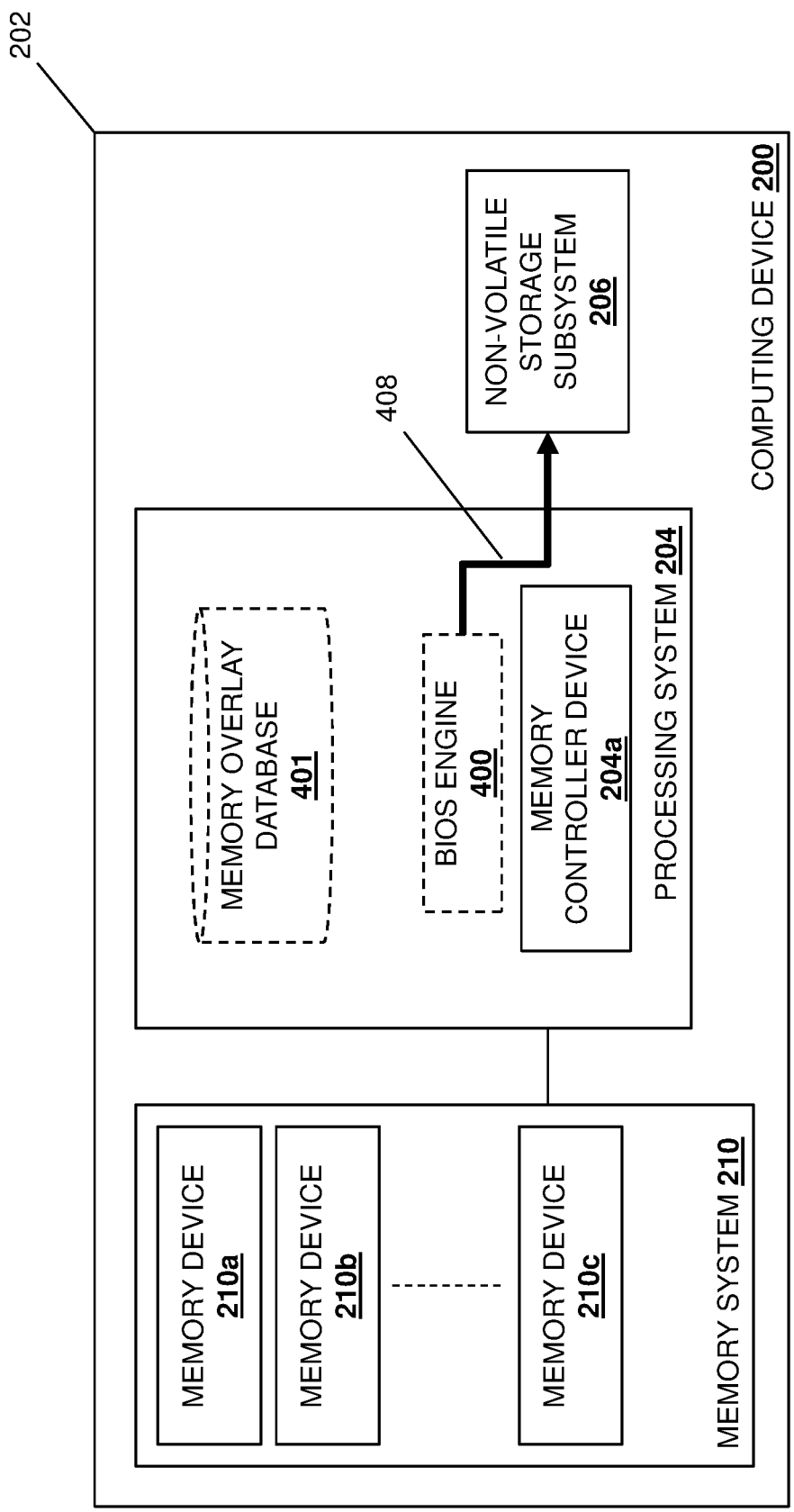
FIG. 4C is a schematic view illustrating an embodiment of the operation of the computing device of FIG. 2 during the method of FIG. 3.

In this example, at least one memory device in the memory system is unavailable and thus, at decision block 306, it is determined that there are unavailable memory devices in the memory system, and the method 300 proceeds to block 312 where the BIOS engine stores unavailable memory device identifiers in the non-volatile storage subsystem. As illustrated in the example provided in FIG. 4B, at block 312 the memory training operations performed by the memory controller device 204a may generate memory training error report(s) 406 that are received by the BIOS engine 400. In response to receiving the memory training error report(s) 406, the BIOS engine 400 may identify the memory devices (which correspond to the unavailable memory device channels that caused those memory training error report(s) to be generated during the memory training operations) as "unavailable memory devices". Furthermore, FIG. 4C illustrates how, in response to identifying the unavailable memory devices, the BIOS engine 400 may perform storage operations 408 to store respective unavailable memory device identifiers associated with each of those unavailable memory devices in the non-volatile storage subsystem 206. For example, at block 312, the BIOS engine 400 may store a respective unavailable memory device channel identifier for each corresponding memory device channel connected to an unavailable memory device in the non-volatile storage subsystem 206. However, while the use of unavailable memory device channel identifiers (e.g., unavailable DIMM channel identifiers) have been described as being utilized to provide the unavailable memory device identifiers associated with unavailable memory devices, one of skill in the art in possession of the present disclosure will appreciate that any identifiers for identifying unavailable memory devices may be utilized at block 312 while remaining within the scope of the present disclosure as well.

Following the storage of the unavailable memory device identifiers at block 312, the BIOS engine 400 may operate to cause the computing device 200 to automatically (e.g., without an instruction from a user of the computing device 200) reboot such that the computing device 200 performs a second initialization that is subsequent to the first initialization discussed above (e.g., a "cold reboot" of the computing device 200), and that includes second initialization operations. As such, the method 300 may then returns to block 302 where computing device initialization operations begin, and to decision block 304 where it is determined whether one or more unavailable memory device identifiers are stored in a non-volatile storage subsystem, each of which is performed substantially as discussed above. However, in this portion of this example in which the second initialization of the computing device 200 is performed following the first initialization of the computing device 200, unavailable memory device identifier(s) were stored in the non-volatile storage subsystem 206 on the previous/first initialization of the computing device 200. As such, at decision block 304, it is determined that unavailable memory device identifiers are stored in the non-volatile storage subsystem, and the method 300 proceeds to block 314 where the BIOS engine generates a memory overlay based on the unavailable memory device identifiers.

Figure 4D:
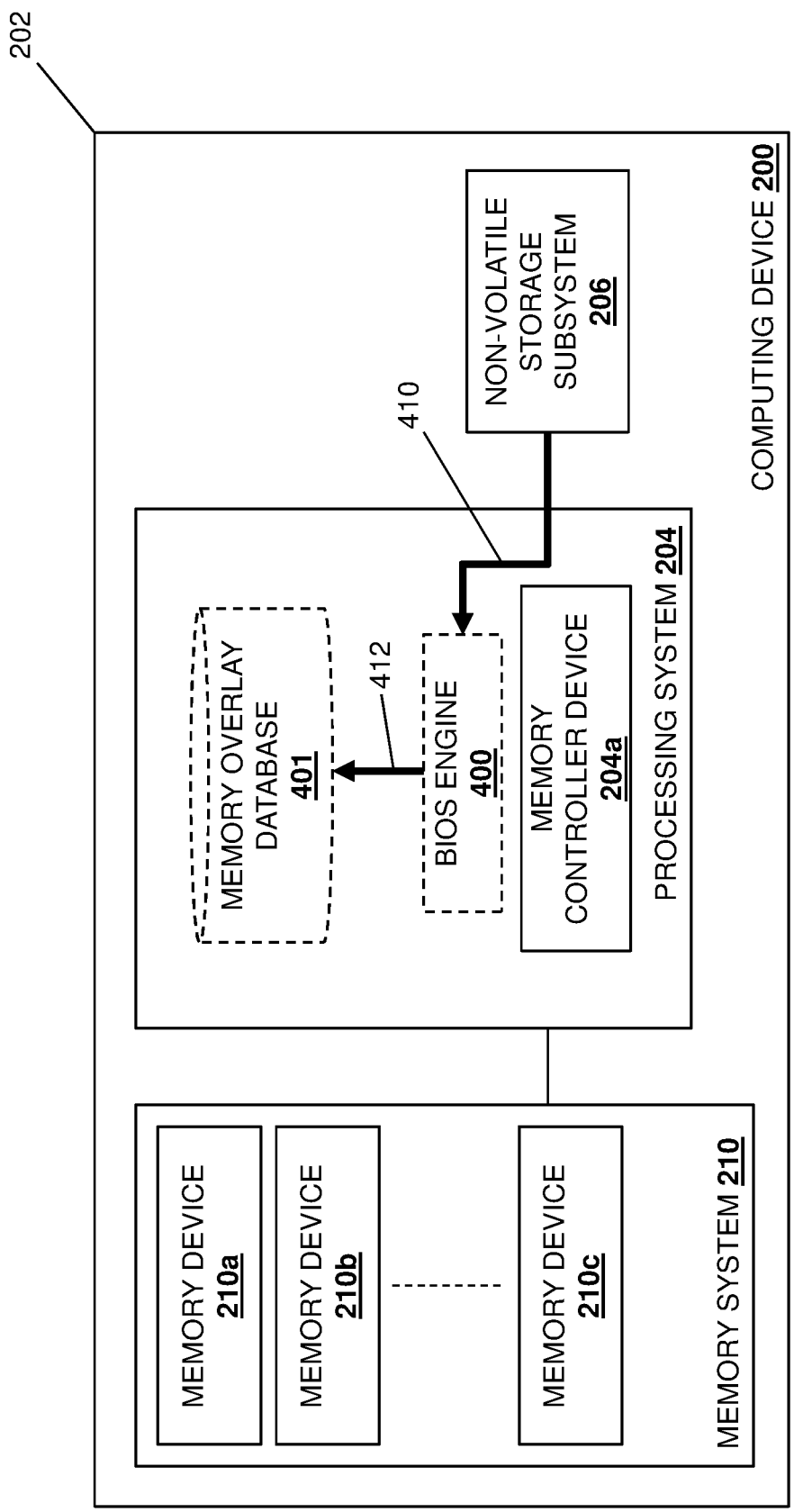
FIG. 4D is a schematic view illustrating an embodiment of the operation of the computing device of FIG. 2 during the method of FIG. 3.

For example, FIG. 4D illustrates how, in an embodiment of block 314, the BIOS engine 400 may perform identification operations 410 to identify the unavailable memory device identifier(s) in the non-volatile storage subsystem 206 as part of the second initialization operations during the second initialization of the computing device 200, and may also perform memory overlay generation operations 412 in which the BIOS engine 400 generates a memory overlay in the memory overlay database 401 that is based on the unavailable memory device identifier(s) stored in the non-volatile storage subsystem 206. For example, the memory overlay generation operations 412 may include the BIOS engine 400 providing, based on the unavailable memory device identifiers stored in the non-volatile storage subsystem 206, respective memory overlay values in the memory overlay database 401 for each of the unavailable memory device identifiers.

As discussed above, the unavailable memory device identifiers may identify unavailable memory device channels coupled to unavailable memory devices, and thus in some embodiments the memory overlay (e.g., a DIMM device population map overlay) may be created that are based on the identity of those unavailable memory device channels and that provides a memory device channel "presence status" that operates to obscure, mask, and/or otherwise hide the presence of the unavailable memory devices coupled to and/or associated with those unavailable memory device channels, which one of skill in the art in possession of the present disclosure will recognize causes a memory controller device utilizing that memory overlay to be unable to detect or "see" the unavailable memory devices/unavailable memory device channels during memory training operations (e.g., by only indicating the presence of memory devices in the memory system 210 that are available.) However, while a specific example is provided, one of skill in the art in possession of the present disclosure will appreciate that other techniques for hiding the unavailable memory devices in the memory system 210 from the memory controller device 204a will fall within the scope of the present disclosure as well.

Figure 4E:
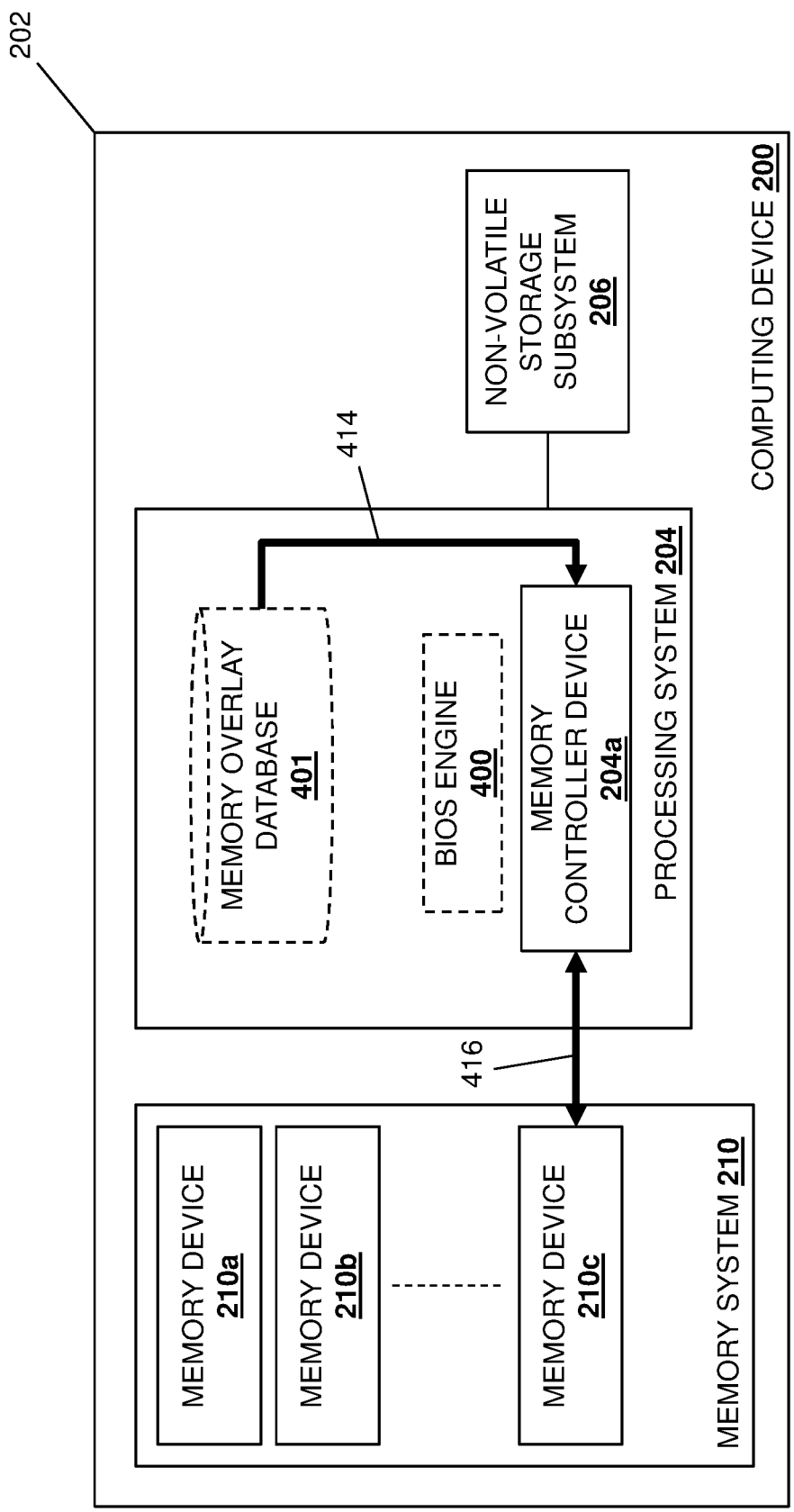
FIG. 4E is a schematic view illustrating an embodiment of the operation of the computing device of FIG. 2 during the method of FIG. 3.

The method 300 then proceeds to decision block 306 where it is determined whether one or more memory devices in a memory system are unavailable. Similarly as discussed above with regard to the first initialization of the computing device 200, at decision block 306 and during the second initialization of the computing device 200, the memory controller device 204a may operate to determine whether there are unavailable memory devices in the memory system 210. For example, FIG. 4E illustrates how the MRC in the BIOS engine 400 may control the memory controller device 204a to perform access operations 402 to access the memory overlay database 401 as part of the second initialization operations during the second initialization of the computing device 200 in order to utilize the memory overlay that was generated and stored therein at block 314 of the method 300, and perform memory device availability determination operations 414 that operate to determine whether there are unavailable memory devices in the memory system 210. For example, at decision block 306, the subsystems provided by Memory Reference Code (MRC) included in the BIOS code discussed above may operate with the memory controller device 204a and utilize the memory overlay generated at block 314 of the method 300 in performing memory training operations in order to determine whether a memory training/MRC training error is present that is indicative of an unavailable memory device channel to a corresponding memory device. However, while a specific technique for determining whether a memory device is available (e.g., via the availability of its memory channel determined during memory training operations), one of skill in the art in possession of the present disclosure will appreciate that other techniques for determining memory device availability will fall within the scope of the present disclosure as well.

Figure 4F:
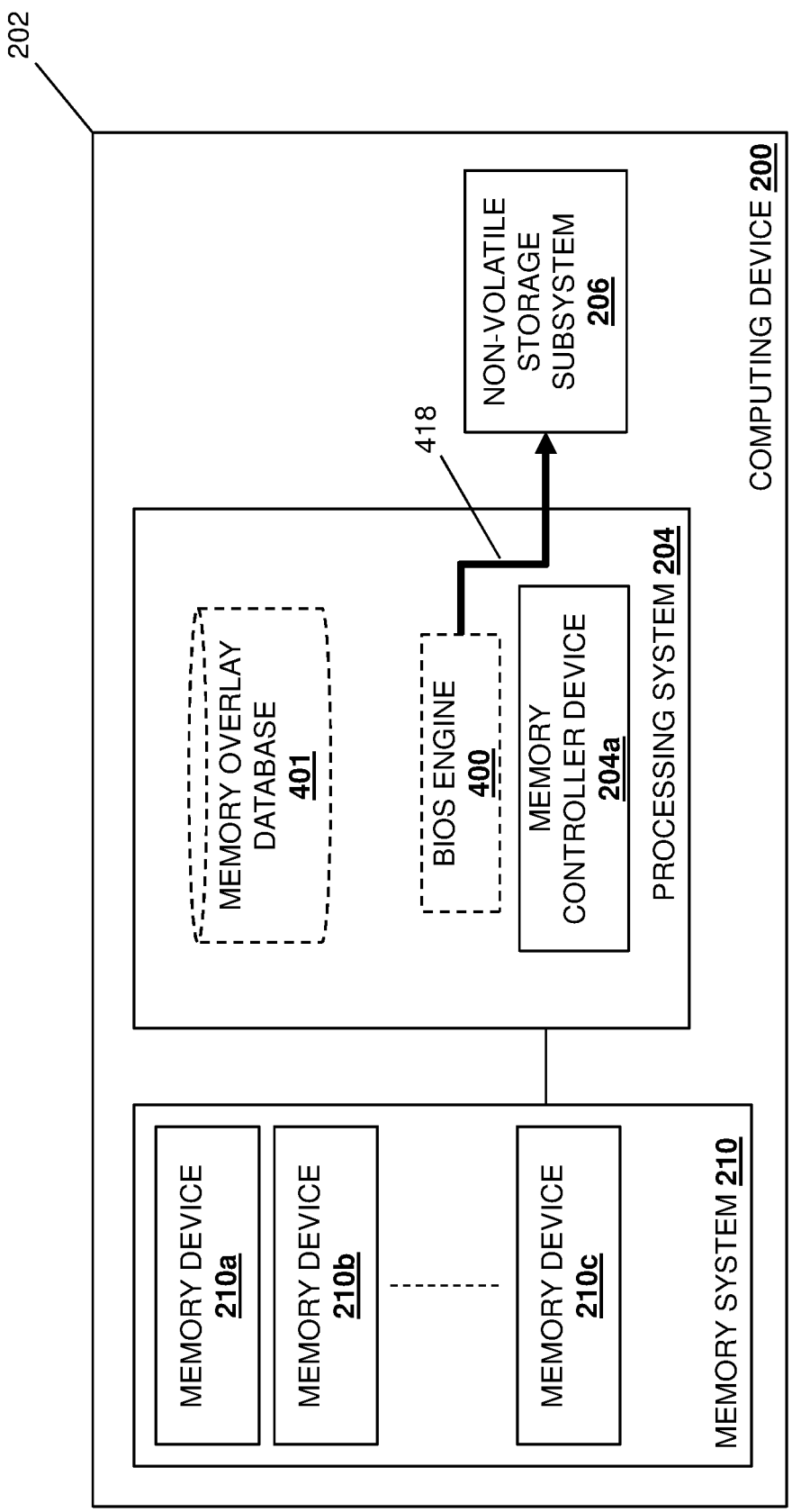
FIG. 4F is a schematic view illustrating an embodiment of the operation of the computing device of FIG. 2 during the method of FIG. 3.

In this example, while at least one memory device in the memory system 210 is unavailable, as discussed above the memory overlay generated at block 314 of the method 300 may operate to cause the memory controller device 204a utilizing that memory overlay to be unable to detect or "see" the unavailable memory devices in the memory system 210 during memory training operations (e.g., by only indicating the presence of memory devices in the memory system 210 that are available.) Thus, at decision block 306, the memory controller device will determine that there are no unavailable memory devices in the memory system 210 during the second initialization of the computing device 200, and the method 300 proceeds to decision block 308 where it is determined whether one or more unavailable memory device identifiers are stored in a non-volatile storage subsystem. As illustrated in FIG. 4F, in an embodiment of decision block 308, the BIOS engine 400 may perform access operations 418 to access the non-volatile storage subsystem 206 to determine whether unavailable memory device identifiers are stored therein.

If, at decision block 308, it is determined that unavailable memory device identifiers are stored in a non-volatile storage subsystem, the method 300 proceeds to block 316 where a BIOS engine logs an error and erases the unavailable memory device identifiers from the non-volatile storage subsystem. In an embodiment, at block 316 and following a determination by the BIOS engine 400 that unavailable memory device identifiers are stored in the non-volatile storage subsystem 206, the BIOS engine 400 may operate to log an error and erase the unavailable memory device identifiers from the non-volatile storage subsystem 206. For example, the access operations 418 performed by the BIOS engine 400 may include the BIOS engine 400 accessing the non-volatile storage subsystem 206, identifying the unavailable memory device identifiers stored therein, logging an error associated with the unavailable memory device identifiers, and erasing the unavailable memory device identifiers. However, while specific timing of the removal of the unavailable memory device identifiers from the non-volatile storage subsystem 206 is described, one of skill in the art in possession of the present disclosure will appreciate that the unavailable memory device identifiers may be removed from the non-volatile storage subsystem 206 at any time following their use in generating the memory overlay at block 314 discussed above while remaining within the scope of the present disclosure as well.

The method 300 then proceeds to block 318 where the BIOS engine provides an initialization proceed request for display. In an embodiment, at block 318, the BIOS engine 400 may operate to provide a graphical user interface for display on a display device coupled to the computing device 200 (not illustrated, but which may be provided by the display device 110 discussed above with reference to FIG. 1), with that graphical user interface including an initialization proceed request. For example, the error logged at block 316 may cause the BIOS engine 400 to provide an initialization proceed request for display to a user of the computing device 200 that informs that user of the unavailable memory device(s) in the computing device 200, and that requests that the user provide an instruction to proceed with completing the second initialization operations such that the computing device enters a runtime environment, or an instruction to halt the second initialization operations such that the computing device does not enter the runtime environment. However, while the method 300 is described as providing a user the ability to decide whether to proceed with initialization operations and enter a runtime environment when unavailable memory devices are identified in the computing device 200, in some embodiments the computing device 200 may proceed with initialization operations and enter a runtime environment when unavailable memory devices are identified in the computing device 200 without instruction from the user of the computing device 200 (but with an indication of an error associated with the unavailable memory device(s) in some examples.)

The method 300 then proceeds to decision block 320 where it is determined whether an instruction to proceed has been received. In an embodiment, at decision block 320, the BIOS engine 400 may determine whether an instruction to proceed has been received from the user of the computing device 200. As discussed above, the graphical user interface displaying the initialization proceed request may allow a user of the computing device 200 to determine whether to proceed with initialization operations and enter a runtime environment by selecting a graphical user interface element that provides that instruction to proceed, and thus the BIOS engine 400 may monitor the initialization proceed request to determine whether such an instruction has been received. If, at decision block 320, it is determined that an instruction to proceed has been received, the method 300 proceeds to block 310 where the BIOS engine completes the initialization operations and the computing device enters the runtime environment in substantially the same manner as described above. For example, in the event the instruction to proceed is received at decision block 320, the BIOS engine 400 may complete the second initialization operations during the second initialization of the computing device 200, and the computing device 200 may enter a runtime environment (e.g., where a CPU in the computing device 200 provides an operating system engine that controls the operation of the computing device 200). As such, in the event there are unavailable memory devices 210a-210c in the memory system 210 in the computing device 200 and the user of the computing device 200 would still like to utilize the computing device 200, the systems and methods of the present disclosure enable them to do so.

If, at decision block 320, it is determined that an instruction to proceed has not been received, the method 300 proceeds to block 322 where the BIOS engine halts the initialization operations. For example, in the event the instruction to proceed is not received at decision block 320 (e.g., the user selects a graphical user interface element that provides an instruction to not proceed with the second initialization, no selection of a graphical user interface element that provides an instruction to proceed with the second initialization is received within a time period, etc.), the BIOS engine 400 may halt the second initialization operations and the second initialization of the computing device 200. As such, in the event there are unavailable memory devices 210a-210c in the memory system 210 in the computing device 200 and the user of the computing device 200 does not wish to utilize the computing device 200 with those unavailable memory devices, the computing device 200 may end the initialization operations such that that the user may remove and/or replace the unavailable memory devices.

Thus, systems and methods have been described that provide for the identification of unavailable DIMM devices in a memory system during computing device boot operations and, in response, the generation of a DIMM device population map overlay that hides each unavailable DIMM device from a memory controller device. As such, the memory controller device may then determine that the memory system does not include any unavailable DIMM devices during performance of memory training operations, which allows the boot operations to complete so that the computing device may enter a runtime environment. For example, during first boot operations, a BIOS engine may identify unavailable DIMM device(s) included in the memory system that were determined to be unavailable by the memory controller device during the first boot operations and, in response, may store respective unavailable DIMM device identifiers associated with each unavailable DIMM device in a non-volatile storage subsystem. Subsequently, during second boot operations and based on the respective unavailable DIMM device identifiers stored in the non-volatile storage subsystem, the BIOS engine may generate a DIMM device population map overlay that hides each unavailable DIMM device. As such, as "software" solution is provided that allows computing device initialization when unavailable DIMM devices exist in the memory system, and that may be utilized with computing devices having relatively inexpensive processing systems that do not include the silicon/chipset hardware/processing system capabilities and MRC error handling code that provide the advanced DIMM device disabling capabilities in the relatively expensive processing systems discussed above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An unavailable memory device initialization system, comprising:
a memory system;
a memory controller device that is coupled to the memory system and configured to:
determine, during initialization operations, whether the memory system includes unavailable memory devices; and
a Basic Input/Output System (BIOS) engine that is coupled to the memory system and the memory controller device, wherein the BIOS engine is configured to:
identify, during first initialization operations, at least one unavailable memory device that is included in the memory system and that was determined to be unavailable by the memory controller device during the first initialization operations;
store, during the first initialization operations in a non-volatile storage subsystem in response to identifying the at least one unavailable memory device, respective unavailable memory device identifiers associated with each at least one unavailable memory device; and
generate, during second initialization operations that are subsequent to the first initialization operations and based on the respective unavailable memory device identifiers stored in the non-volatile storage subsystem, a memory overlay that hides each at least one unavailable memory device from the memory controller device such that the memory controller device determines that the memory system does not include any unavailable memory devices during the second initialization operations.

2. The system of claim 1, wherein the identifying the at least one unavailable memory device that is included in the memory system and that was determined to be unavailable by the memory controller device during the first initialization operations includes:
identifying a respective Memory Reference Code (MRC) training error determined by the memory controller device during the first initialization operations for each at least one unavailable memory device.

3. The system of claim 1, wherein the generating the memory overlay includes:
providing, during the second initialization operations and based on the respective unavailable memory device identifiers stored in the non-volatile storage subsystem, respective memory overlay values in a memory overlay database for each unavailable memory device identifiers.

4. The system of claim 1, wherein each at least one unavailable memory device that is included in the memory system and that was determined to be unavailable by the memory controller device during the first initialization operations is identified by a respective unavailable memory device channel associated with that unavailable memory device.

5. The system of claim 1, wherein the BIOS engine is configured to:
automatically cause, subsequent to storing the respective unavailable memory device identifiers associated with each at least one unavailable memory device in the non-volatile storage subsystem during the first initialization operations, a reboot that begins the second initialization operations.

6. The system of claim 1, wherein the BIOS engine is configured to:
identify, during the second initialization operations in the non-volatile storage subsystem, the respective unavailable memory device identifiers;
provide, for display in response to identifying the respective unavailable memory device identifiers in the non-volatile storage subsystem, an initialization proceed request; and
complete, in response to receiving an affirmative response to the initialization proceed request, the second initialization operations such that a runtime environment is provided.

7. An Information Handling System (IHS), comprising:
a processing system; and
a memory system that is coupled to the processing system and that includes instructions that, when executed by the processing system, cause the processing system to provide a Basic Input/Output System (BIOS) engine that is configured to:
identify, during first initialization operations, at least one unavailable memory device that is included in the memory system and that was determined to be unavailable by a memory controller device during the first initialization operations;
store, during the first initialization operations in a non-volatile storage subsystem in response to identifying the at least one unavailable memory device, respective unavailable memory device identifiers associated with each at least one unavailable memory device; and
generate, during second initialization operations that are subsequent to the first initialization operations and based on the respective unavailable memory device identifiers stored in the non-volatile storage subsystem, a memory overlay that hides each at least one unavailable memory device from the memory controller device such that the memory controller device determines that the memory system does not include any unavailable memory devices during the second initialization operations.

8. The IHS of claim 7, wherein the identifying the at least one unavailable memory device that is included in the memory system and that was determined to be unavailable by the memory controller device during the first initialization operations includes:
identifying a respective Memory Reference Code (MRC) training error determined by the memory controller device during the first initialization operations for each at least one unavailable memory device.

9. The IHS of claim 7, wherein the generating the memory overlay includes:
providing, during the second initialization operations and based on the respective unavailable memory device identifiers stored in the non-volatile storage subsystem, respective memory overlay values in a memory overlay database for each unavailable memory device identifiers.

10. The IHS of claim 7, wherein each at least one unavailable memory device that is included in the memory system and that was determined to be unavailable by the memory controller device during the first initialization operations is identified by a respective unavailable memory device channel associated with that unavailable memory device.

11. The IHS of claim 7, wherein the BIOS engine is configured to:
automatically cause, subsequent to storing the respective unavailable memory device identifiers associated with each at least one unavailable memory device in the non-volatile storage subsystem during the first initialization operations, a reboot that begins the second initialization operations.

12. The IHS of claim 7, wherein the BIOS engine is configured to:
identify, during the second initialization operations in the non-volatile storage subsystem, the respective unavailable memory device identifiers;
provide, for display in response to identifying the respective unavailable memory device identifiers in the non-volatile storage subsystem, an initialization proceed request; and
complete, in response to receiving an affirmative response to the initialization proceed request, the second initialization operations such that a runtime environment is provided.

13. The IHS of claim 12, wherein the BIOS engine is configured to:
erase, during the second initialization operations, the respective unavailable memory device identifiers from the non-volatile storage subsystem.

14. A method for initializing a computing device including an unavailable memory device, comprising:
identifying, by a BIOS engine provide by a processing system during first initialization operations, at least one unavailable memory device that is included in the memory system and that was determined to be unavailable by a memory controller device during the first initialization operations;
storing, by the BIOS engine during the first initialization operations in a non-volatile storage subsystem in response to identifying the at least one unavailable memory device, respective unavailable memory device identifiers associated with each at least one unavailable memory device; and
generating, by the BIOS engine during second initialization operations that are subsequent to the first initialization operations and based on the respective unavailable memory device identifiers stored in the non-volatile storage subsystem, a memory overlay that hides each at least one unavailable memory device from the memory controller device such that the memory controller device determines that the memory system does not include any unavailable memory devices during the second initialization operations.

15. The method of claim 14, wherein the identifying the at least one unavailable memory device that is included in the memory system and that was determined to be unavailable by the memory controller device during the first initialization operations includes:
  identifying a respective Memory Reference Code (MRC) training error determined by the memory controller device during the first initialization operations for each at least one unavailable memory device.

16. The method of claim 14, wherein the generating the memory overlay includes:
  providing, during the second initialization operations and based on the respective unavailable memory device identifiers stored in the non-volatile storage subsystem, respective memory overlay values in a memory overlay database for each unavailable memory device identifiers.

17. The method of claim 14, wherein each at least one unavailable memory device that is included in the memory system and that was determined to be unavailable by the memory controller device during the first initialization operations is identified by a respective unavailable memory device channel associated with that unavailable memory device.

18. The method of claim 14, further comprising:
  automatically causing, by the BIOS engine subsequent to storing the respective unavailable memory device identifiers associated with each at least one unavailable memory device in the non-volatile storage subsystem during the first initialization operations, a reboot that begins the second initialization operations.

19. The method of claim 14, further comprising:
identifying, by the BIOS engine during the second initialization operations in the non-volatile storage subsystem, the respective unavailable memory device identifiers;
providing, by the BIOS engine for display in response to identifying the respective unavailable memory device identifiers in the non-volatile storage subsystem, an initialization proceed request; and
completing, by the BIOS engine in response to receiving an affirmative response to the initialization proceed request, the second initialization operations such that a runtime environment is provided.

20. The method of claim 19, further comprising:
  erase, by the BIOS engine during the second initialization operations, the respective unavailable memory device identifiers from the non-volatile storage subsystem.

* * * * *